United States Patent
Naik et al.

(10) Patent No.: US 12,225,423 B2
(45) Date of Patent: Feb. 11, 2025

(54) METHOD TO AVOID BAD USER EXPERIENCE BY USING RAPID INITIAL IMS REGISTRATION

(71) Applicant: MEDIATEK INC., Hsin-Chu (TW)

(72) Inventors: Rohit Naik, Hsin-Chu (TW); Hsin-Jun Tang, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 334 days.

(21) Appl. No.: 17/833,622

(22) Filed: Jun. 6, 2022

(65) Prior Publication Data

US 2023/0397070 A1  Dec. 7, 2023

(51) Int. Cl.

| | |
|---|---|
| *H04W 36/14* | (2009.01) |
| *H04L 65/1016* | (2022.01) |
| *H04L 65/1073* | (2022.01) |
| *H04W 36/30* | (2009.01) |
| *H04W 48/18* | (2009.01) |
| *H04W 60/00* | (2009.01) |

(52) U.S. Cl.
CPC ......... *H04W 36/14* (2013.01); *H04L 65/1016* (2013.01); *H04L 65/1073* (2013.01); *H04W 36/30* (2013.01)

(58) Field of Classification Search
CPC . H04W 76/19; H04W 36/0005; H04W 36/14; H04W 36/30; H04L 65/1016; H04L 65/1073
See application file for complete search history.

(56) References Cited

U.S. PATENT DOCUMENTS

| | | | |
|---|---|---|---|
| 11,943,669 B2* | 3/2024 | Kabadi | H04L 65/65 |
| 2011/0028120 A1* | 2/2011 | Wu | H04L 65/1095 |
| | | | 455/404.1 |
| 2014/0078898 A1* | 3/2014 | Anchan | H04W 36/0066 |
| | | | 370/230 |
| 2014/0162659 A1* | 6/2014 | Aminaka | H04W 36/144 |
| | | | 455/437 |
| 2015/0304316 A1* | 10/2015 | Ye | H04L 63/0853 |
| | | | 455/411 |

(Continued)

FOREIGN PATENT DOCUMENTS

WO    WO 2022/057473 A1    9/2020

OTHER PUBLICATIONS

3GPP 3GPP TS 24.301 V17.6.0; Technical Specification Group Core Network and Terminals; NonAccess-Stratum (NAS) protocol for Evolved Packet System (EPS); Stage 3 (Release 17) Mar. 25, 2022 3GPP Mar. 25, 2022 https://www.3gpp.org/ftp/Specs/archive/24_series/24. 301/24301-h60.zip.

*Primary Examiner* — Jenee Holland
(74) *Attorney, Agent, or Firm* — Helen Mao; Zheng Jin; Imperium Patent Works

(57) ABSTRACT

A method of improving user experience for initial IP Multimedia Subsystem (IMS) registration is proposed. When a UE boots up or leaves flight mode, the processor of the UE determines a period Tn of time for IMS PDN initial setup on a single Access-Stratum Network, starting from sending IMS PDN setup request. Upon expiration of Tn, the UE aborts the IMS PDN set up request, and performs IMS PDN set up on another Access-Stratum Network. As a result, it allows the UE to rapidly use IMS service when boots up or leaves flight mode.

16 Claims, 4 Drawing Sheets

(56) References Cited

U.S. PATENT DOCUMENTS

| | | | |
|---|---|---|---|
| 2015/0350983 A1* | 12/2015 | Kwok | H04W 36/00226 |
| | | | 370/331 |
| 2016/0080981 A1* | 3/2016 | Wang | H04W 36/1446 |
| | | | 370/331 |
| 2016/0219474 A1* | 7/2016 | Singh | H04W 36/00837 |
| 2016/0366631 A1* | 12/2016 | Crisci | H04W 64/00 |
| 2019/0254094 A1* | 8/2019 | Babu | H04W 76/11 |
| 2019/0356635 A1* | 11/2019 | Chiang | H04L 63/0281 |
| 2020/0305019 A1 | 9/2020 | Karri | H04L 29/06 |
| 2021/0044628 A1* | 2/2021 | Foti | H04L 65/1073 |
| 2022/0369197 A1* | 11/2022 | Naik | H04W 36/30 |
| 2022/0400360 A1* | 12/2022 | Chiang | H04W 4/50 |

\* cited by examiner

METHOD TO AVOID BAD USER EXPERIENCE BY USING RAPID INITIAL IMS REGISTRATION

TECHNICAL FIELD

The disclosed embodiments relate generally to wireless communication, and, more particularly, to method of improving user experience using rapid initial IMS registration.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G. IP Multimedia Subsystem (IMS) service will be an important feature for the new generation system, e.g., NG system (NGS) or 5G system (5GS).

As set forth in the 3GPP, IP Multimedia Subsystem (IMS) is a core network that provides IP multimedia services to user equipments (UEs) over an Internet Protocol (IP) network. Historically, mobile phones have provided voice call services over a circuit-switched (CS) network, rather than strictly over an IP packet-switched (PS) network. Alternative methods of delivering voice or other multimedia services over IP have become available on smartphones (e.g. VoIP or Skype), but they have not become standardized across the industry. IMS is an architectural framework to provide such standardization. IMS is able to communicate with UEs through different types of access network, such as a wireless local area network (WLAN), an Ethernet network, a packet data network (PDN), or another type of access network. IMS is a new way to dial PS call over LTE or over New Radio (NR) (Voice over IP or Voice over LTE or Voice over NR) instead of fallback to 2G/3G legacy CS call.

IMS contains several application services such as voice call (VoLTE or VoNR), SMS, instant message (IM), discovery presence (DP), etc. over the IP network. UE will send SIP REGISTER to the IMS server to inform UE's capability and request for service. When both WiFi and cellular RAN are available and UE is WiFi preferred for IMS, the UE may first try to register IMS on WiFi. However, if there are issues between UE and EPC/5GC through WiFi, it would cause the registration failure and the UE will enter a retry procedure. Before concluding that WiFi is not available and find the alternate RAN, the UE will retry to register over WiFi 4 times (when retry count=4). These retry may take more than 60s and would result in UE not being registered for 60 seconds. It causes UE not able to use IMS service in that duration which will result in bad user experience.

A solution for improvement is sought.

SUMMARY

A method of improving user experience for initial IP Multimedia Subsystem (IMS) registration is proposed. When a UE boots up or leaves flight mode, the processor of the UE determines a period Tn of time for IMS PDN initial setup on a single Access-Stratum Network, starting from sending an IMS PDN setup request. Upon expiration of Tn, the UE aborts the IMS PDN set up procedure, and performs IMS PDN set up on another Access-Stratum Network. As a result, it allows the UE to rapidly use IMS service when boots up or leaves flight mode.

In one embodiment, a UE initiates an IP Multimedia Subsystem (IMS) registration procedure in a mobile communication network, e.g., triggered by the UE powering on, leaving flight mode, or turning on IMS setting. The UE sends an initial IMS registration request to an IMS server over a first radio access type (RAT), e.g., the first RAT is a UE-preferred RAT. The UE starts a guard timer upon sending the initial IMS registration request. The UE aborts the IMS registration procedure over the first RAT upon the guard timer expiry. The UE transmits another initial IMS registration request to the IMS server over a second RAT, wherein the UE establishes a connection with the network upon successful IMS registration over the second RAT.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
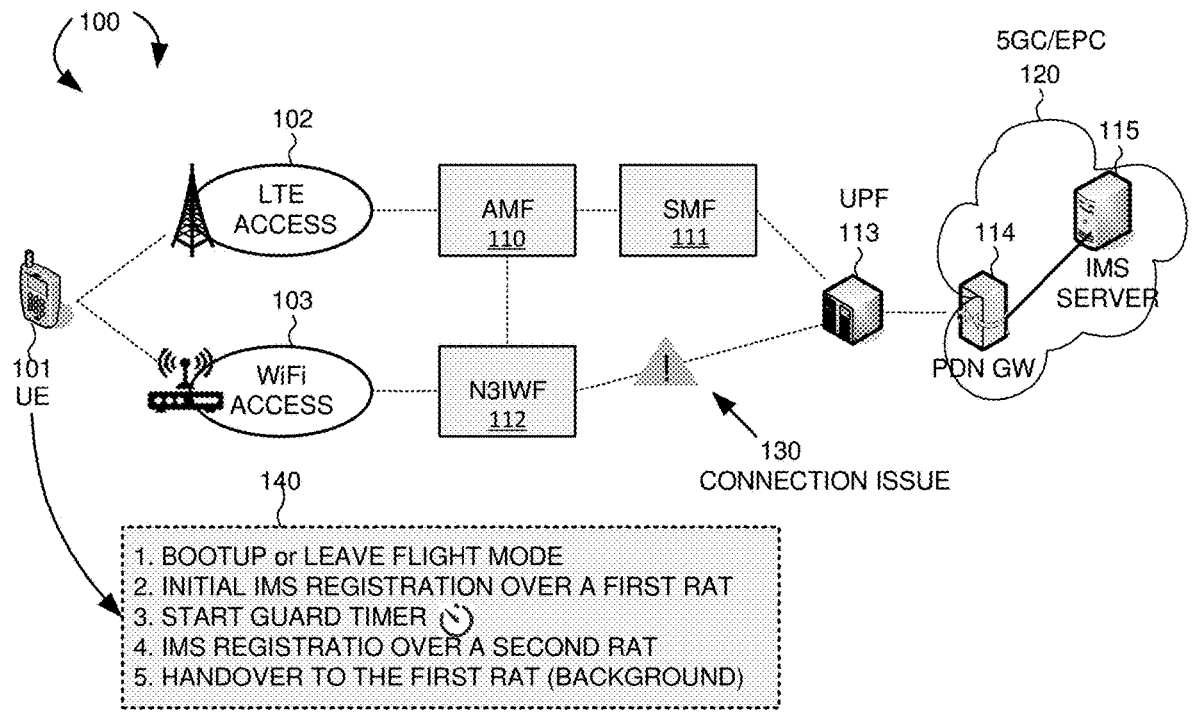
FIG. 1 illustrates an exemplary LTE/5G network supporting improvement for initial IMS registration in accordance with one novel aspect.

FIG. 1 illustrates an exemplary LTE 4G or new radio (NR) 5G network 100 supporting improvement for initial IP Multimedia Subsystem (IMS) registration in accordance with one novel aspect. LTE/NR network 100 comprises a user equipment (UE) 101, a 3GPP radio access network RAN 102, a non-3GPP radio access network RAN 103, an Access and Mobility Management Function (AMF) 110, a Session Management Function (SMF) 111, an Non-3GPP Interworking Function (N3IWF) 112, a User Plane Function (UPF) 113, and a 5G core network or evolved packet core network (5GC/EPC) 120. The AMF communicates with the base station, SMF and UPF for access and mobility management of wireless access devices in 5G NR network 100. The SMF is primarily responsible for interacting with the decoupled data plane, creating, updating and removing Protocol Data Unit (PDU) sessions and managing session context with the UPF. The N3IWF functionality interfaces to 5G core network control plane functions, responsible for routing messages outside 5G RAN. UE 101 may be equipped with a radio frequency (RF) transceiver or multiple RF transceivers for services via different RATs/CNs. UE 101 may be a smart phone, a wearable device, an Internet of Things (IoT) device, a tablet, etc. In FIG. 1, LTE/NR network 100 also comprises application servers including IMS server 115 that provides various services by communicating with a plurality of UEs including UE 101. IMS server 115 and a packet data network gateway (PDN GW or P-GW) 114 belong to part of the 5GC/EPC 120.

LTE and NR networks are packet-switched (PS) Internet Protocol (IP) networks. This means that the networks deliver all data traffic in IP packets, and provide users with Always-On IP Connectivity. When UE joins an LTE/NR network, a Packet Data Network (PDN) address (i.e., the one that can be used on the PDN) is assigned to the UE for its connection to the PDN. LTE/NR calls the UE's "IP access connection" an evolved packet system (EPS) bearer, which is a connection between the UE and the P-GW. The P-GW is the default gateway for the UE's IP access. LTE/NR has defined a Default EPS Bearer to provide the IP Connectivity that is Always-On. UE may establish additional data radio bearers for data communication.

IMS is a core network that provides IP multimedia services to UEs over an IP network. IMS contains several application services such as voice call (VoLTE or VoNR), SMS, instant message (IM), discovery presence (DP), etc. over the IP network. UE will send a Session initiation protocol (SIP) REGISTER to the IMS server to inform UE's capability and to request for IMS service. The initial IMS registration from the UE may fail due to subscription specific reason or due to some temporary failures in the network. In one application scenario, when both WiFi and cellular RAN are available and UE 101 is WiFi preferred for IMS, UE 101 may first try to register IMS on WiFi. However, if there are issues between UE and EPC/5GC through WiFi (e.g., a temporally connection issue as depicted by 130), it would cause the registration failure and UE 101 will enter a retry procedure. Before concluding that WiFi is not available and find the alternate RAN, UE 101 will retry to register over WiFi 4 times (when retry count=4). These retry may take more than 60 sec and would result in UE 101 not being registered for 60 sec (when maximum retry count=4 and retry timer=15 sec). It causes UE 101 not able to use IMS service in that duration which will result in bad user experience.

In accordance with one novel aspect, a method of improving user experience for initial IMS registration is proposed. In the example of FIG. 1, as depicted by 140, UE 101 performs rapid IMS registration as follows: 1) UE 101 boots up or leaves flight mode or turns on IMS setting, 2) UE 101 starts IMS registration by sending an IMS PDN setup request over a preferred RAT (non-3GPP WiFi access); 3) the processor of the UE starts a guard timer Tn for the IMS PDN initial setup on WiFi, starting from the sending of the IMS PDN setup request; 4) upon expiration of Tn, UE 101 aborts the current IMS PDN set up, and performs IMS PDN set up on another RAT (3GPP cellular access); 5) continue try PDN handover to the preferred WiFi access (in background). As a result, the proposed initial IMS registration procedure allows UE 101 to rapidly use IMS service when boots up or leaves flight mode or turns on IMS setting, when there are connection issues between UE 101 and EPC/5GC 120 over the preferred RAT.

Figure 2:
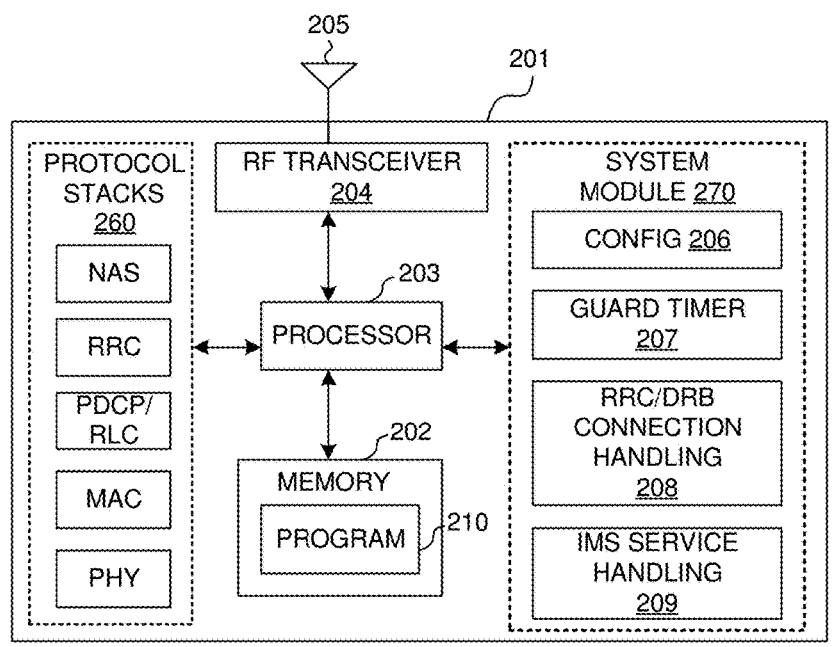
FIG. 2 illustrates simplified block diagrams of a user equipment (UE) in accordance with embodiments of the current invention.

FIG. 2 illustrates simplified block diagrams of a UE 201 in accordance with embodiments of the current invention. UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of protocol stacks 260 and control circuits including various system modules and circuits 270 to carry out functional tasks of UE 201. Protocol stacks 260 comprises Non-Access-Stratum (NAS) layer to communicate with a mobility management entity (MME) connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network.

In one example, system modules and circuits 270 comprise a configuration and control circuit 206 that obtains configuration and control information for IMS registration, a guard timer 207 that is started upon determining initial IMS registration, a PDN connection/PDU session handling circuit 208 that handles RRC connection for control and establishes DRB connection for data, and an IMS service handling circuit 209 for performing IMS functionalities. When the UE boots up or leaves flight mode, the processor of the UE determines a period Tn of time for IMS PDN initial setup on a single AS NW, starting from sending IMS PDN setup request. Upon expiration of Tn, the UE aborts the IMS PDN set up request, and performs IMS PDN set up on another AS NW. As a result, it allows the UE to rapidly get capability to use IMS service when boots up or leaves flight mode.

Figure 3:
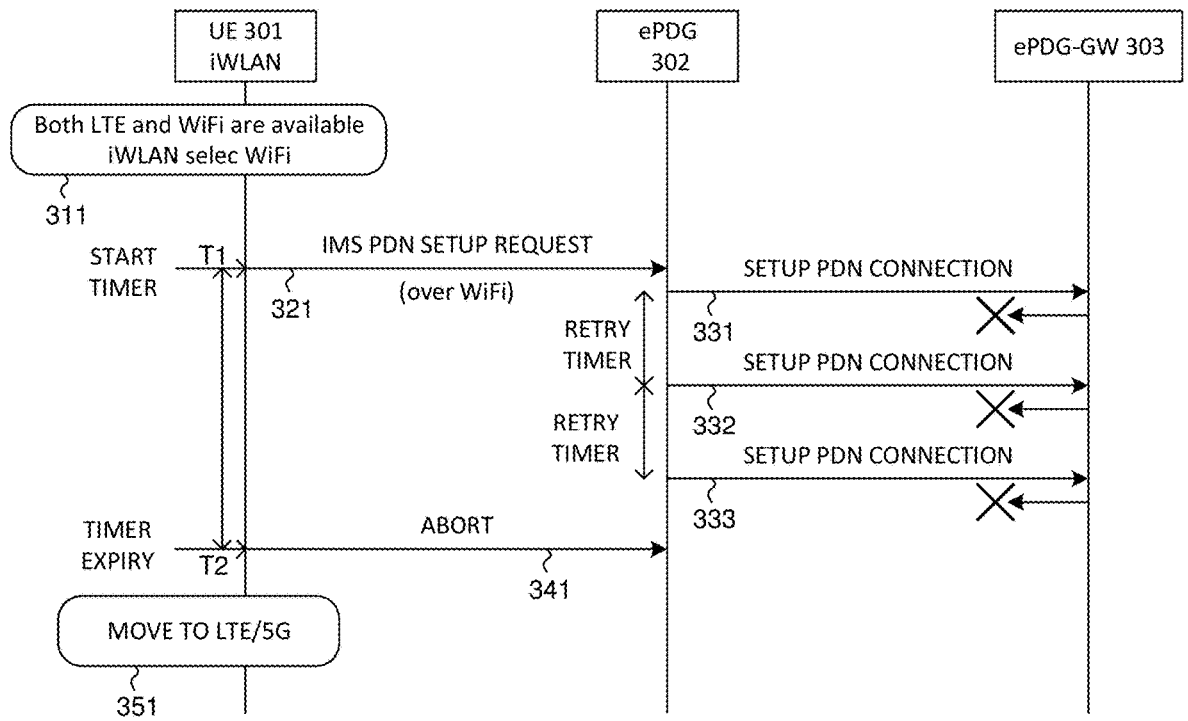
FIG. 3 illustrates a first embodiment of IMS registration using a new timer in accordance with one novel aspect.

FIG. 3 illustrates a first embodiment of IMS registration using a new timer in accordance with one novel aspect. In step 311, UE 301 powers on or turns off air-plane mode or activates IMS service. When both LTE and WiFi are available, and the UE is WiFi-preferred, or when the WiFi signal strength or quality is higher, then UE 301 (iWLAN) selects WiFi for IMS registration. In step 321, UE 301 sends an IMS PDN setup request to ePDG 302 over the WiFi access. Meanwhile, at time T1, UE 301 also starts a guard timer Tn. In step 331, ePDG 302 forwards the PDN setup request to ePDG-GW 303, but does not receive any response due to a connection issue. Upon retry timer expiry, in step 332, ePDG 302 re-sends the PDN setup request to ePDG-GW 303, but does not receive any response due to a connection issue. In step 333, ePDG 302 continues the retry process upon expiry of the retry timer. At time T2, the guard timer Tn expires. In response, in step 341, UE 301 aborts the IMS registration procedure. In step 351, UE 301 moves to LTE/5G and tries IMS registration over LTE/5G 3GPP access. Because UE 301 applies the guard timer Tn, in addition to the retry timer and retry count, the overall wait time for IMS registration is reduced, when the preferred access has a connection issue. The guard timer value can be configured based on operator/network conditions. This first embodiment has a simple design and is easy to implement, with a very clear and definite handling/action. However, the ePDG connection may need to be aborted midway if the guard timer expires before connection setup completed.

Figure 4:
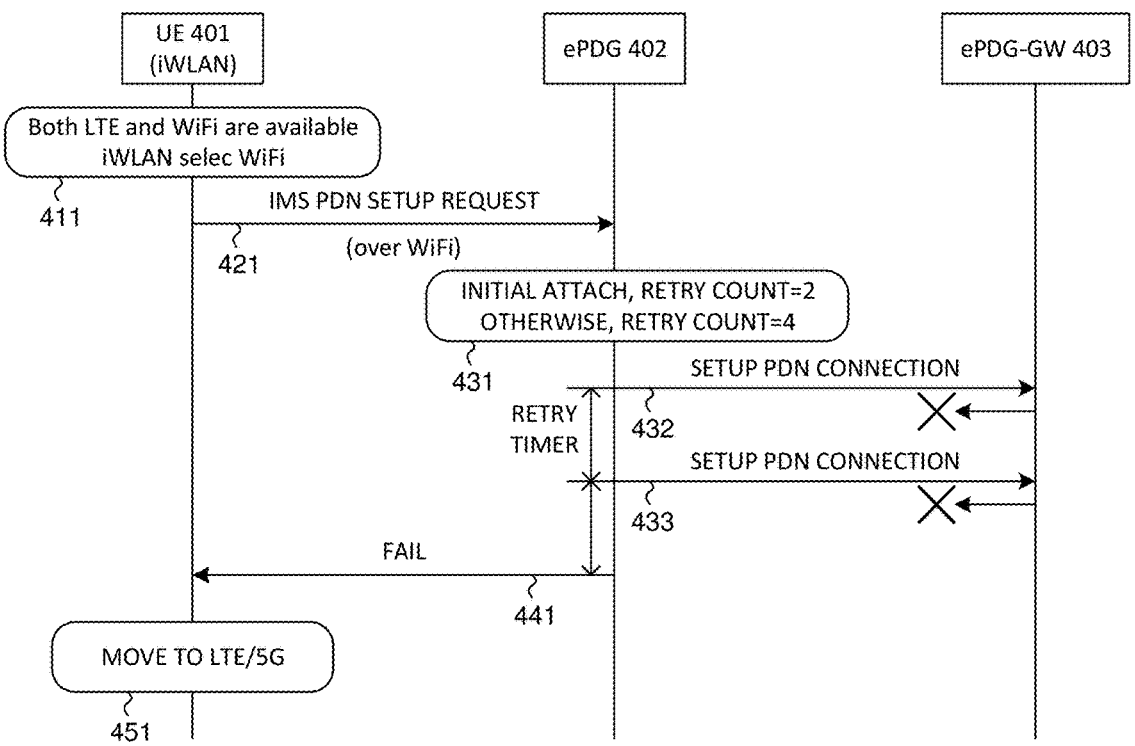
FIG. 4 illustrates a second embodiment of IMS registration using a new retry count in accordance with one novel aspect.

FIG. 4 illustrates a second embodiment of IMS registration using a new retry count in accordance with one novel aspect. In step 411, UE 401 powers on or turns off air-plane mode. When both LTE and WiFi are available, and the UE is WiFi-preferred, or the WiFi signal strength or quality is higher, then UE 401 (iWLAN) selects WiFi for IMS registration. In step 421, UE 401 sends an IMS PDN setup request to ePDG 402 over the WiFi access. In step 431, ePDG 402 determines whether the requested IMS registration is for initial registration or for handover registration. If for initial registration, then the retry count is reduced to 2; if for handover registration, then the retry count is kept as its original value of 4. In the example of FIG. 4, since it is the initial registration, the retry count is set to 2. In step 432, ePDG 402 forwards the PDN setup request to ePDG-GW 403, but does not receive any response due to a connection issue. Upon retry timer expiry, in step 433, ePDG 402 re-sends the PDN setup request to ePDG-GW 403, but does not receive any response due to a connection issue. Because the retry count has already reached to 2, in step 441, ePDG 402 sends an error message to UE 401 indicating the failure of the IMS registration over WiFi. Accordingly, in step 451, UE 401 moves to LTE/5G and tries IMS registration over LTE/5G 3GPP cellular access. Because UE 401 applies reduced maximum retry count (2), the overall wait time for IMS registration is reduced, when the preferred access has a connection issue. This second embodiment can leverage the core retry logic algorithm. However, the UE needs to maintain separate logic to differentiate initial registration vs handover registration.

Figure 5:
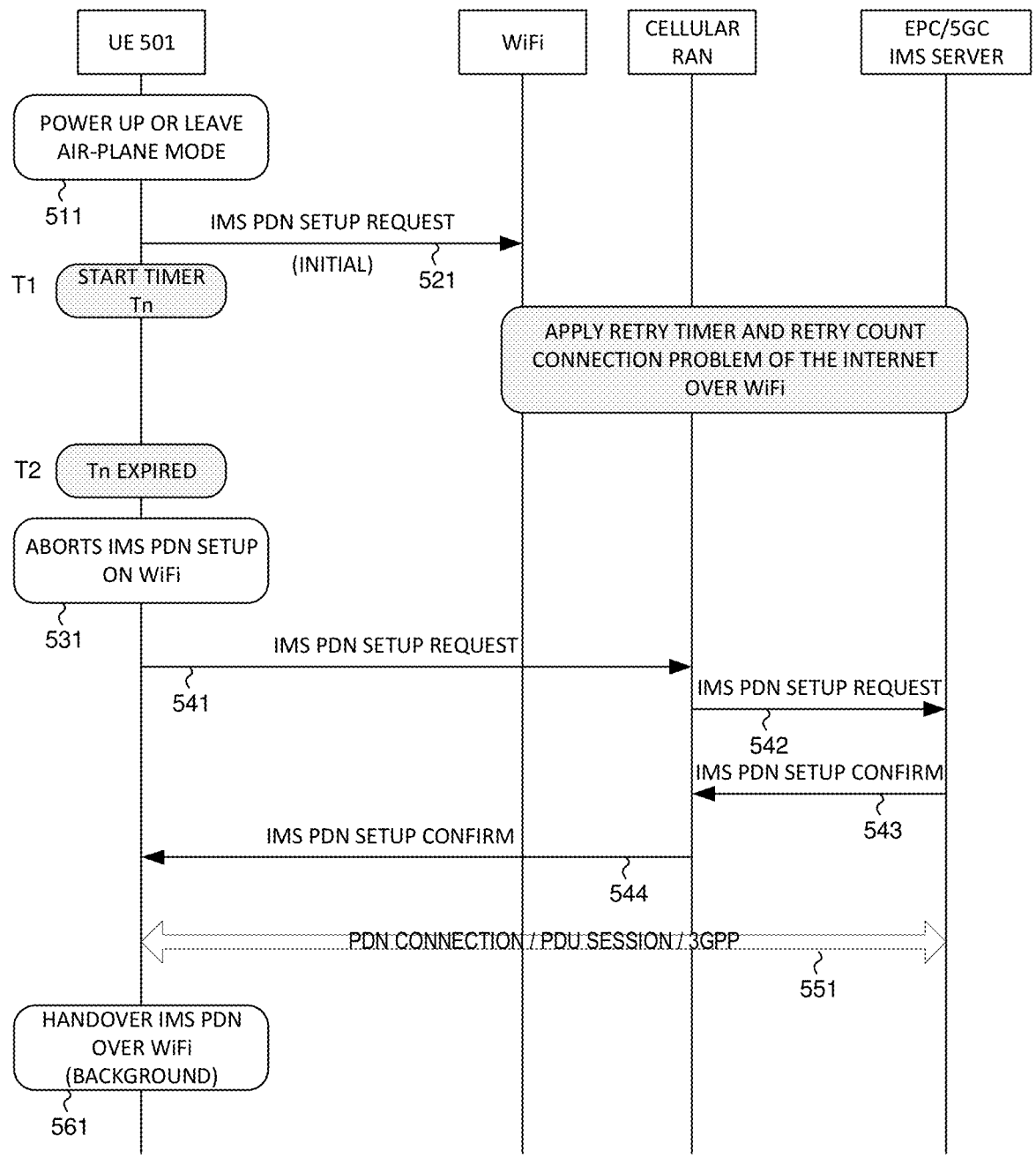
FIG. 5 illustrates a preferred embodiment of rapid initial IMS registration using a new timer in accordance with one novel aspect.

FIG. 5 illustrates a preferred embodiment of rapid initial IMS registration using a new timer in accordance with one novel aspect. In step 511, UE 501 powers up or leaves airplane mode or activates IMS service. UE 501 has a preferred access type, e.g., WiFi, for performing IMS registration and establish PDN connection or PDU session. In step 521, UE 501 sends an initial IMS PDN setup request over the WiFi access type. UE 501 determines that the IMS registration is an initial registration (as compared to a handover registration). UE 501 then determines a period Tn of guard time for the initial IMS PDN setup on a single AS NW (WiFi), starting from the sending of the IMS PDN setup request. Accordingly, at time T1, UE 501 starts the guard timer Tn. In the embodiment of FIG. 5, there are connection problem of the Internet over the WiFi access type. As a result, UE 501 is not able to register for IMS service over WiFi successfully. UE 501 then enters a retry procedure for the IMS PDN setup, subject to a retry timer and a retry count. At time T2, the guard timer Tn expires, before reaching the retry count.

In order to reduce the wait time for the initial IMS registration, in step 531, UE 501 aborts the IMS PDN setup on WiFi in response to the guard timer expiry, and moves to 3GPP access for IMS registration. Note that from time T1 to time T2, UE 501 continue to send and resend the IMS PDN setup request, based on a retry timer with a maximum retry count mechanism. At time T2, the UE has not reached the maximum retry count, but the guard timer expires. The value of the guard timer is configurable by the network. Typically, the length of the guard time (e.g., 7 sec) is much less than the total time of (retry timer) times (maximum retry count) (e.g., 60 sec=15×4). In step 541, UE 501 sends an initial IMS PDN setup request over cellular RAN. In step 542, the cellular RAN forwards the IMS PDN setup request to the EPC/5GC/IMS server. In step 543, the cellular RAN receives IMS PDN setup confirm from the EPC/5GC/IMS server. In step 544, the cellular RAN forwards the IMS PDN setup confirm back to UE 501. In step 551, a PDN connection or PDU session is established between UE 501 and the core network for receiving IMS services. Because WiFi is the preferred access type, in step 561, UE 501 continues to try handover the PDN connection or PDU session over WiFi access in background.

Figure 6:
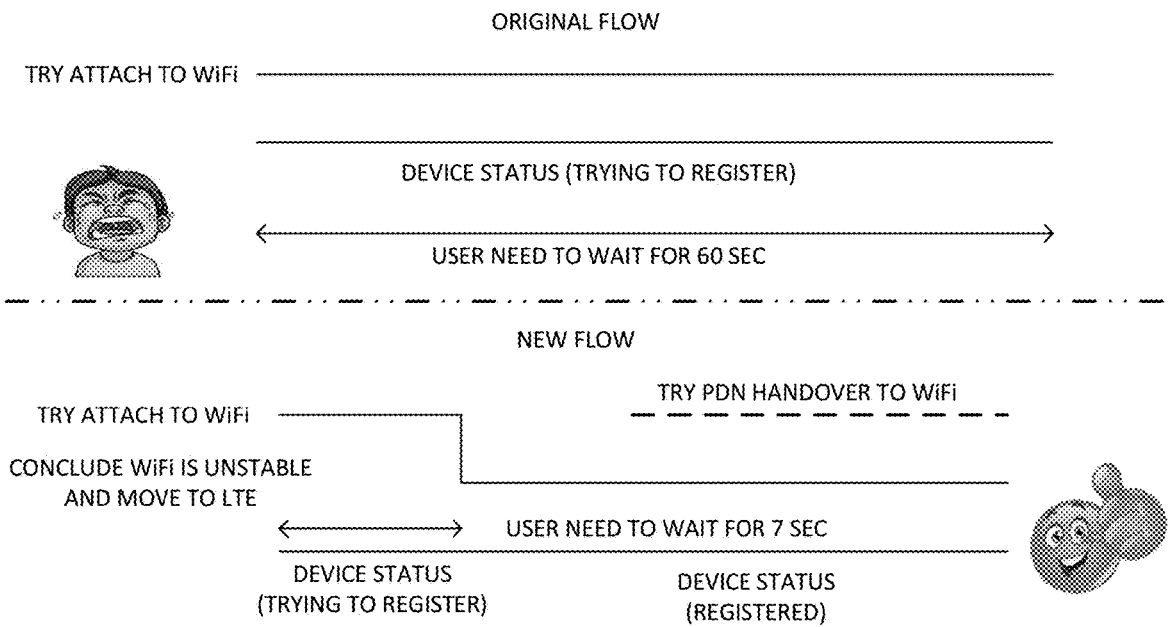
FIG. 6 illustrates the difference between the original flow and the new flow of IMS registration and user experience.

FIG. 6 illustrates the difference between the original flow and the new flow of IMS registration and user experience. Under the original IMS registration flow, UE tries to attach to WiFi (that has a connection issue). UE will continue to send IMS PDN setup request until reaching maximum retry count with a retry timeout. As a result, the UE status remains at "trying to register", and user needs to wait for 60 seconds for IMS registration. Under the new IMS registration flow, UE tries to attach to WiFi (that has a connection issue), UE will quickly conclude that WiFi is unstable and move to 3GPP (with the use of a guard timer). As a result, the UE status changes from "trying to register" to "IMS registered", and user needs to wait for 7 seconds for IMS registration.

Figure 7:
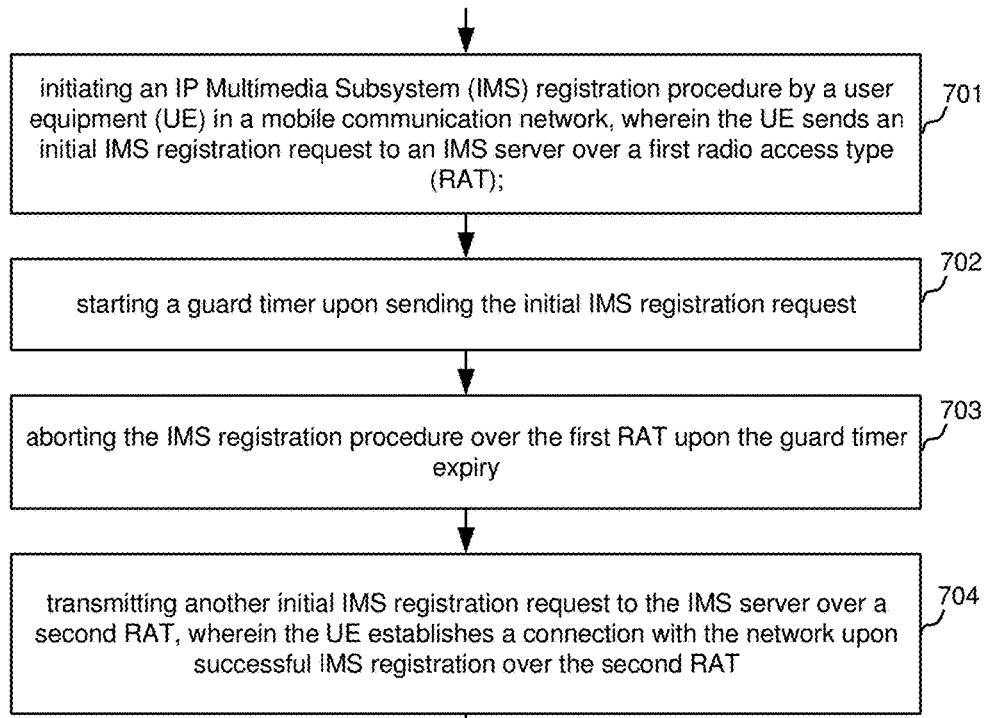
FIG. 7 is a flow chart of a method of supporting rapid IMS registration to improve user experience in accordance with one novel aspect.

FIG. 7 is a flow chart of a method of supporting rapid IMS registration to improve user experience in accordance with one novel aspect. In step 701, a UE initiates an IP Multimedia Subsystem (IMS) registration procedure in a mobile communication network, wherein the UE sends an initial IMS registration request to an IMS server over a first radio access type (RAT). In step 702, the UE starts a guard timer upon sending the initial IMS registration request. In step 703, the UE aborts the IMS registration procedure over the first RAT upon the guard timer expiry. In step 704, the UE transmits another initial IMS registration request to the IMS server over a second RAT, wherein the UE establishes a connection with the network upon successful IMS registration over the second RAT.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
initiating an IP Multimedia Subsystem (IMS) registration procedure by a user equipment (UE) in a mobile communication network, wherein the UE sends an initial IMS registration request to an IMS server over a first radio access type (RAT);
starting a guard timer upon sending the initial IMS registration request;
aborting the IMS registration procedure over the first RAT upon the guard timer expiry; and
transmitting another initial IMS registration request to the IMS server over a second RAT, wherein the UE establishes a connection with the network upon successful IMS registration over the second RAT, wherein the first RAT is a UE-preferred RAT, or the first RAT has a better radio signal strength or quality than the second RAT, and wherein the UE continues to handover the established connection to the first RAT in background.

2. The method of claim 1, wherein the IMS registration procedure is triggered by the UE powering on, leaving flight mode, or turning on IMS setting.

3. The method of claim 1, wherein the initial IMS registration request is an IMS packet data network (PDN) SETUP REQUEST message.

4. The method of claim 3, wherein the IMS PDN SETUP REQUEST message is subject to a retry timeout and a maximum retry count, when the UE does not receive an IMS PDN SETUP CONFIRM message before guard timer expiry.

5. The method of claim 4, wherein the UE applies the guard timer in addition to the retry timeout and the maximum retry count.

6. The method of claim 1, wherein the guard timer is configured by the network.

7. The method of claim 1, wherein the first RAT is a non-3GPP RAT, and wherein the second RAT is a 3GPP RAT.

8. The method of claim 1, wherein the first RAT is a 3GPP RAT, and wherein the second RAT is a non-3GPP RAT.

9. A User Equipment (UE), comprising:
an IP Multimedia Subsystem (IMS) handling circuit that initiates an IMS registration procedure in a mobile communication network, wherein the UE sends an initial IMS registration request to an IMS server over a first radio access type (RAT);
a guard timer that is started upon sending the initial IMS registration request, wherein the UE aborts the IMS registration procedure over the first RAT upon the guard timer expiry; and
a transmitter that transmits another initial IMS registration request to the IMS server over a second RAT, wherein the UE establishes a connection with the network upon successful IMS registration over the second RAT, wherein the first RAT is a UE-preferred RAT, or the first RAT has a better radio signal strength or quality than the second RAT, and wherein the UE continues to handover the established connection to the first RAT in background.

10. The UE of claim 9, wherein the IMS registration procedure is triggered by the UE powering on, leaving flight mode, or turning on IMS setting.

11. The UE of claim 9, wherein the initial IMS registration request is an IMS packet data network (PDN) SETUP REQUEST message.

12. The UE of claim 11, wherein the IMS PDN SETUP REQUEST message is subject to a retry timeout and a maximum retry count, when the UE does not receive an IMS PDN SETUP CONFIRM message before guard timer expiry.

13. The UE of claim 12, wherein the UE applies the guard timer in addition to the retry timeout and the maximum retry count.

14. The UE of claim 9, wherein the guard timer is configured by the network.

15. The UE of claim 9, wherein the first RAT is a non-3GPP RAT, and wherein the second RAT is a 3GPP RAT.

16. The UE of claim 9, wherein the first RAT is a 3GPP RAT, and wherein the second RAT is a non-3GPP RAT.

* * * * *